(12) United States Patent
Tomosada et al.

(10) Patent No.: US 10,749,328 B2
(45) Date of Patent: Aug. 18, 2020

(54) WIRE HARNESS

(71) Applicant: Yazaki Corporation, Tokyo (JP)

(72) Inventors: Kosuke Tomosada, Shizuoka (JP); Naoto Kogure, Shizuoka (JP); Katsumi Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/695,151

(22) Filed: Nov. 25, 2019

(65) Prior Publication Data

US 2020/0176967 A1    Jun. 4, 2020

(30) Foreign Application Priority Data

Nov. 30, 2018   (JP) .................... 2018-225033

(51) Int. Cl.
*H02G 11/00* (2006.01)
*B60R 16/02* (2006.01)
*H02G 3/04* (2006.01)
*H01B 7/00* (2006.01)

(52) U.S. Cl.
CPC ......... *H02G 11/00* (2013.01); *B60R 16/0207* (2013.01); *H01B 7/0045* (2013.01); *H02G 3/0406* (2013.01); *H02G 3/0487* (2013.01)

(58) Field of Classification Search
CPC .................................................. H02G 11/00

USPC ....................................................... 174/70 R
See application file for complete search history.

(56) References Cited

U.S. PATENT DOCUMENTS

| 10,587,106 B1* | 3/2020 | Sato ..................... H01B 7/0045 |
| 2018/0178740 A1* | 6/2018 | Tomosada ............ H02G 3/0462 |

FOREIGN PATENT DOCUMENTS

JP      2003-339113 A    11/2003

* cited by examiner

*Primary Examiner* — Stanley Tso
(74) *Attorney, Agent, or Firm* — Kenealy Vaidya LLP (57) ABSTRACT

A wire harness includes a conductor that flexibly connects a vehicle body side of a vehicle and a moving body that is mounted in the vehicle and slides with respect to the vehicle body, a regulation member that is configured by stacking a plurality of flexible plate members, extends along the conductor, and regulates a path of the conductor, and a pair of holding members that hold ends of the plurality of plate members. In the ends of the plurality of plate members, long holes are formed that extend along a longitudinal direction of the plate member at positions facing each other. The holding member includes a convex portion that is inserted in the long hole. The convex portion allows one plate member to relatively move along the longitudinal direction with respect to another plate member in a state where the convex portion is inserted in the long hole.

8 Claims, 12 Drawing Sheets

WIRE HARNESS

CROSS-REFERENCE TO RELATED APPLICATION(S)

The present application claims priority to and incorporates by reference the entire contents of Japanese Patent Application No. 2018-225033 filed in Japan on Nov. 30, 2018.

BACKGROUND OF THE INVENTION

1. Field of the Invention

The present invention relates to a wire harness.

2. Description of the Related Art

Conventionally, a wire harness is known which is used in a moving body such as a slide door. Japanese Patent Application Laid-open No. 2003-339113 discloses a mounting error preventing structure of a harness biasing member in which a harness supporting cap is provided on a side near a tip end of a spring member. In the mounting error preventing structure of the harness biasing member of Japanese Patent Application Laid-open No. 2003-339113, a concave portion is provided on one side and the other side of a base end of the spring member to be deviated in position in a longitudinal direction of the spring member. A convex portion to be matched to each concave portion is provided in an assembly counterpart of the spring member.

Herein, in a case where a plurality of plate members are stacked as a regulation member extending along a conductor, an inner/outer circumference difference may occur in the plurality of plate members. If the ends of the plate members are fixed, the inner/outer circumference difference is not absorbed, and the regulation member may not perform a desired function.

SUMMARY OF THE INVENTION

An object of the invention is to provide a wire harness which is able to absorb the inner/outer circumference difference occurring in the plurality of plate members.

In order to achieve the above mentioned object, a wire harness according to one aspect of the present invention includes a flexible conductor that connects a vehicle body side of a vehicle and a moving body, the moving body being mounted in the vehicle and sliding with respect to the vehicle body; a regulation member that is configured by stacking a plurality of flexible plate members, extends along the conductor, and regulates a path of the conductor; and a pair of holding members that hold ends of the plurality of plate members, wherein in the ends of the plurality of plate members, long holes are formed which extend along a longitudinal direction of the plate member at positions facing each other, the holding member includes a convex portion that is inserted in the long hole, and the convex portion allows one plate member to relatively move along the longitudinal direction with respect to another plate member in a state where the convex portion is inserted in the long hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a wire harness according to embodiments of the invention will be described with reference to the drawings. Further, the invention is not limited to the embodiments. In addition, components in the following embodiments include substantively same components which are easily assumed by a person skilled in the art.

Embodiments

Figure 1:
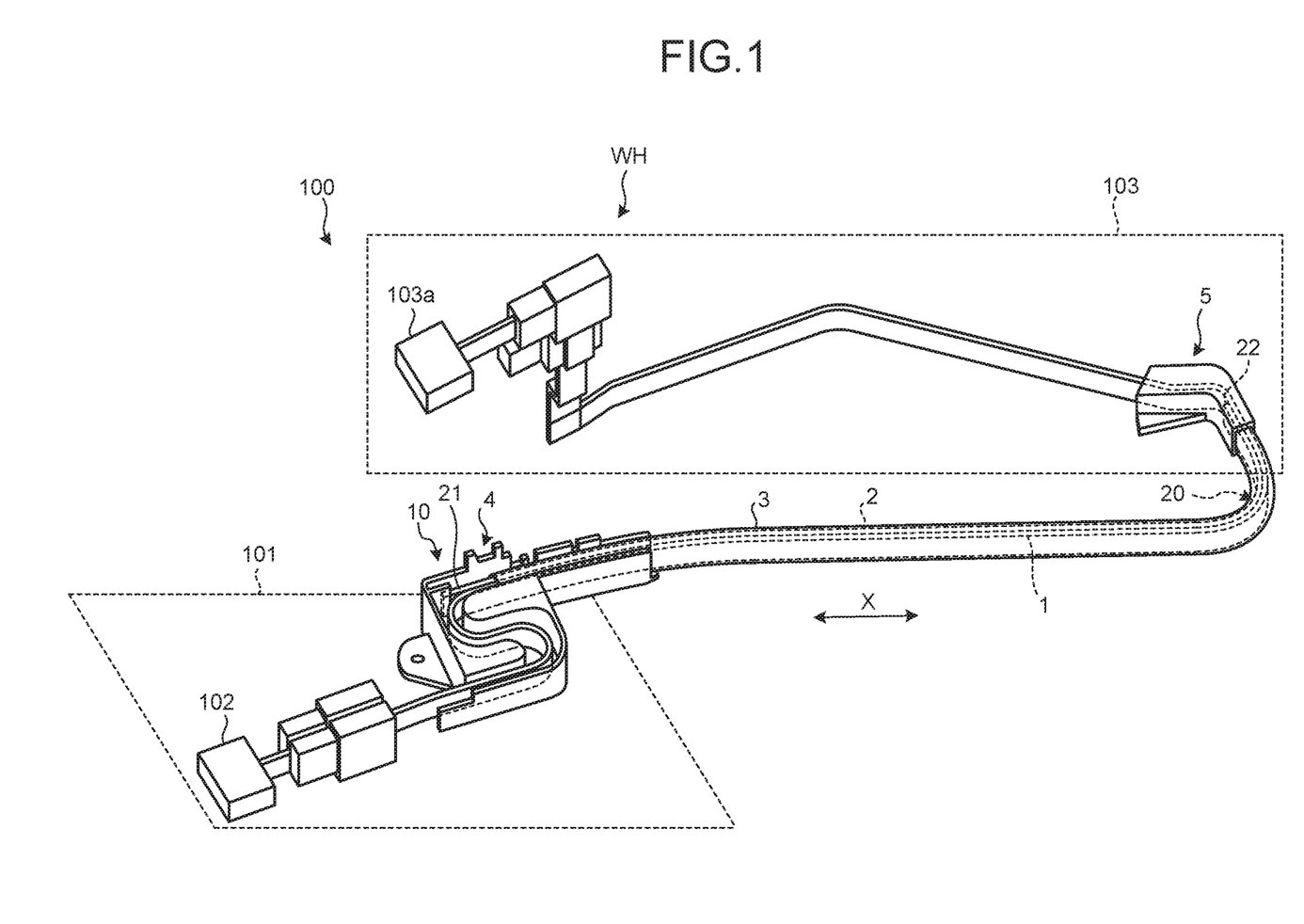
FIG. 1 is a perspective view of a wire harness according to an embodiment.
Figure 2:
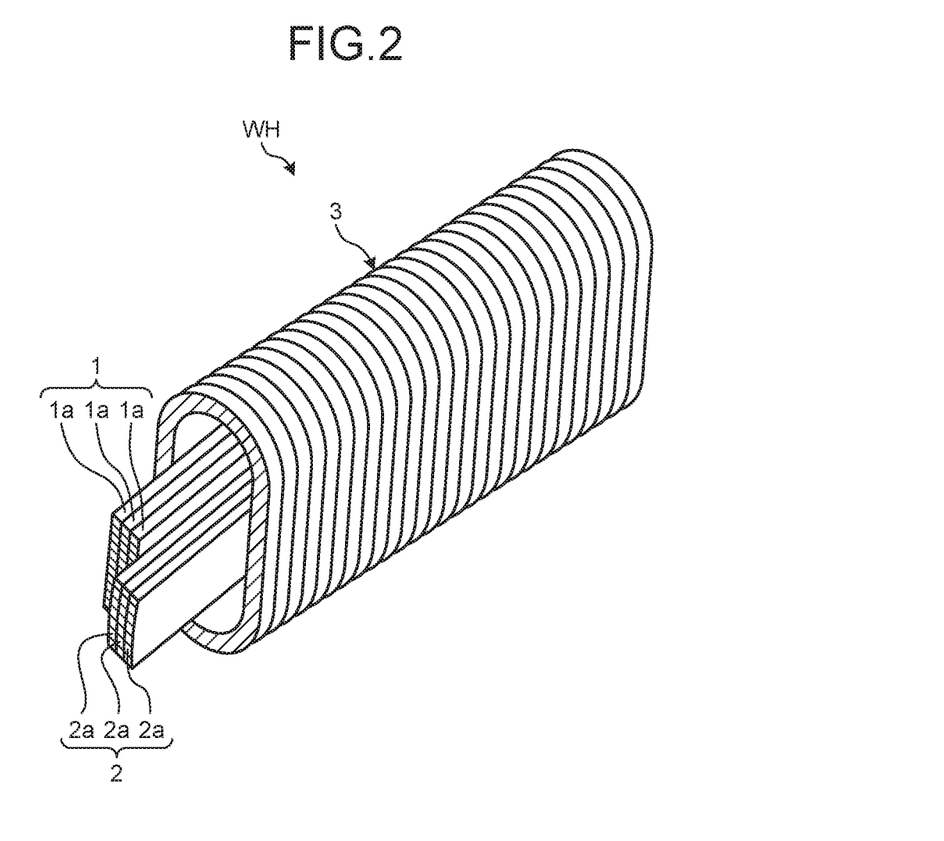
FIG. 2 is a perspective view of a conductor, a regulation member, and an exterior member according to the embodiment.
Figure 3:
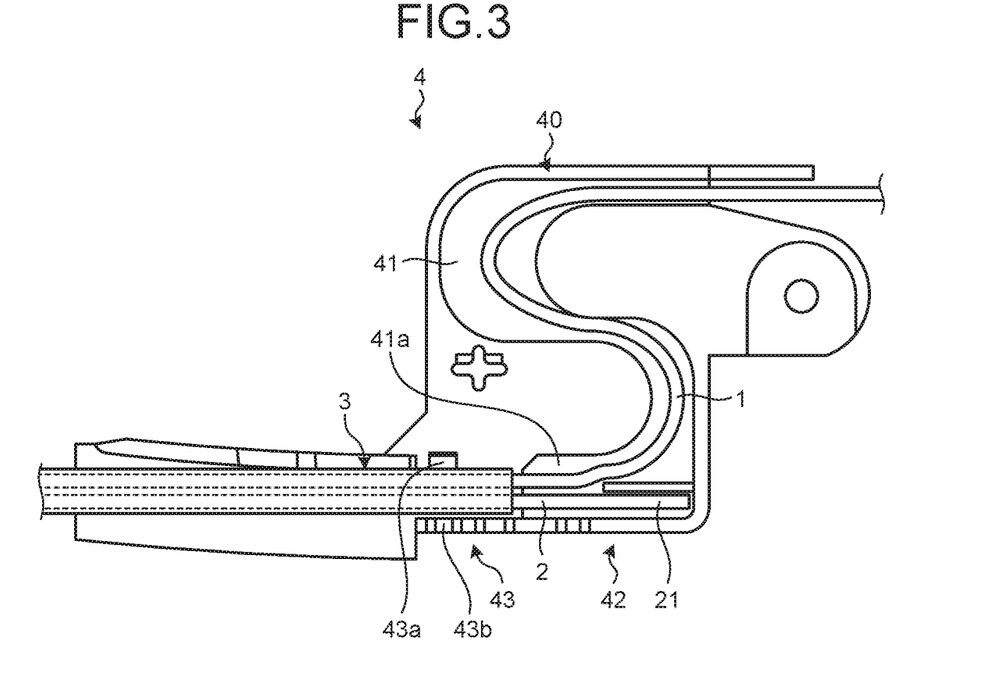
FIG. 3 is a top view of a first holding member according to the embodiment.
Figure 4:
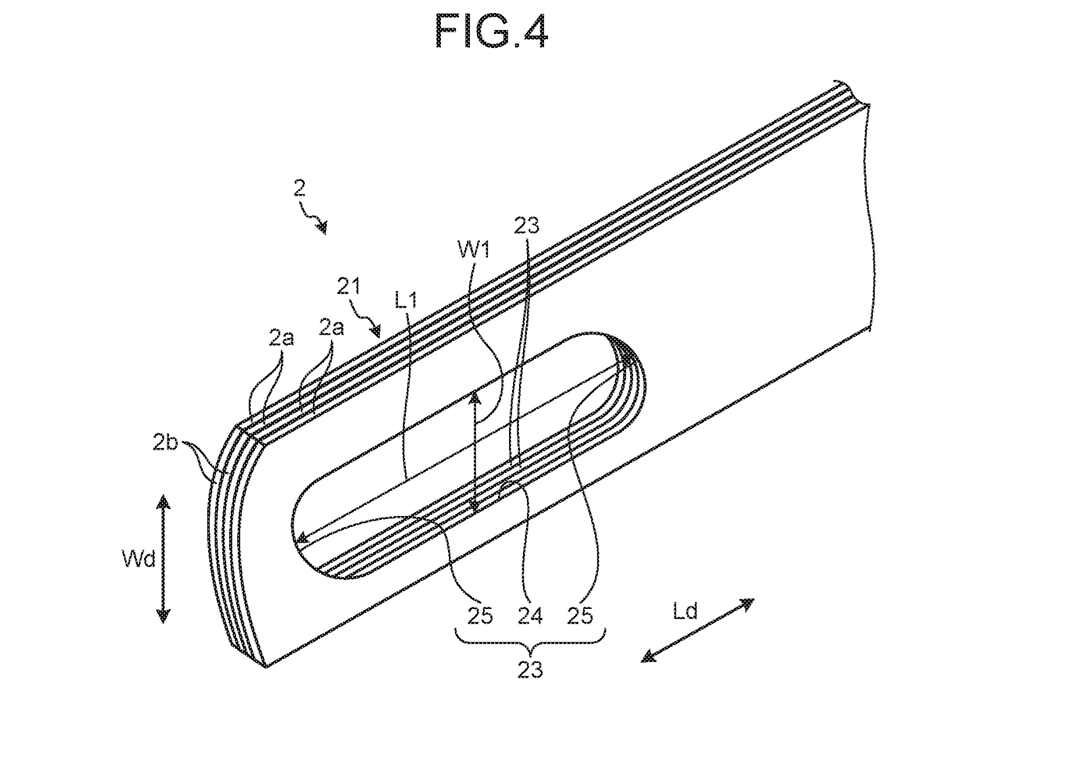
FIG. 4 is a perspective view of the regulation member according to the embodiment.
Figure 5:
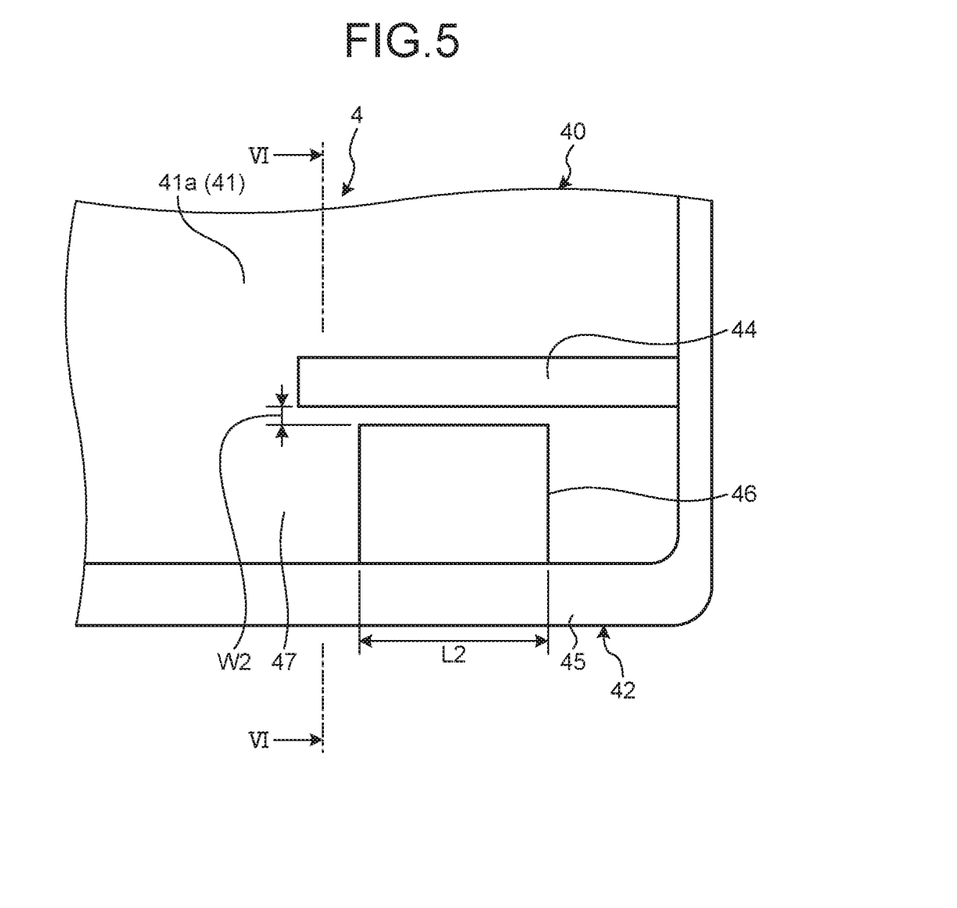
FIG. 5 is a top view of the holding portion according to the embodiment.
Figure 6:
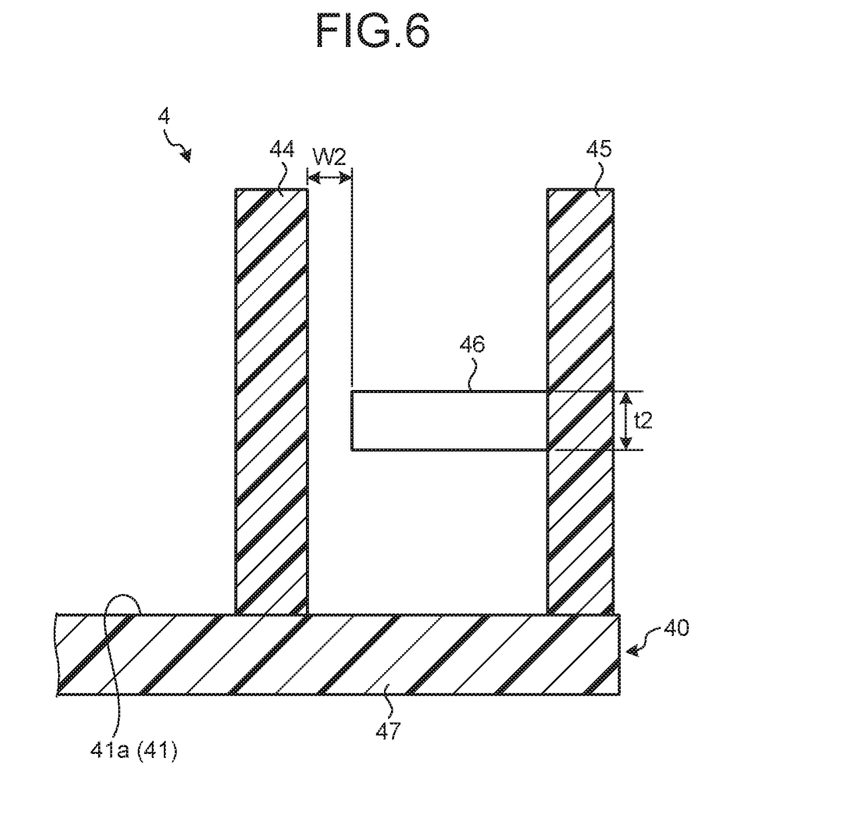
FIG. 6 is a cross-sectional view of the holding portion according to the embodiment.
Figure 7:
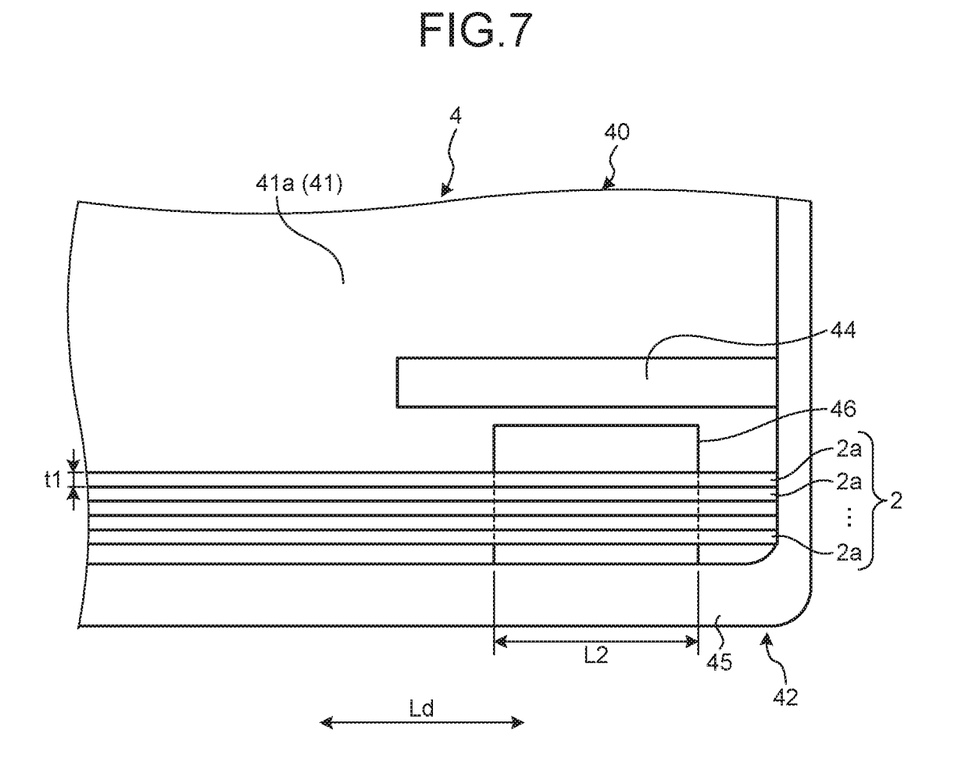
FIG. 7 is a top view of the holding portion which holds the regulation member.
Figure 8:
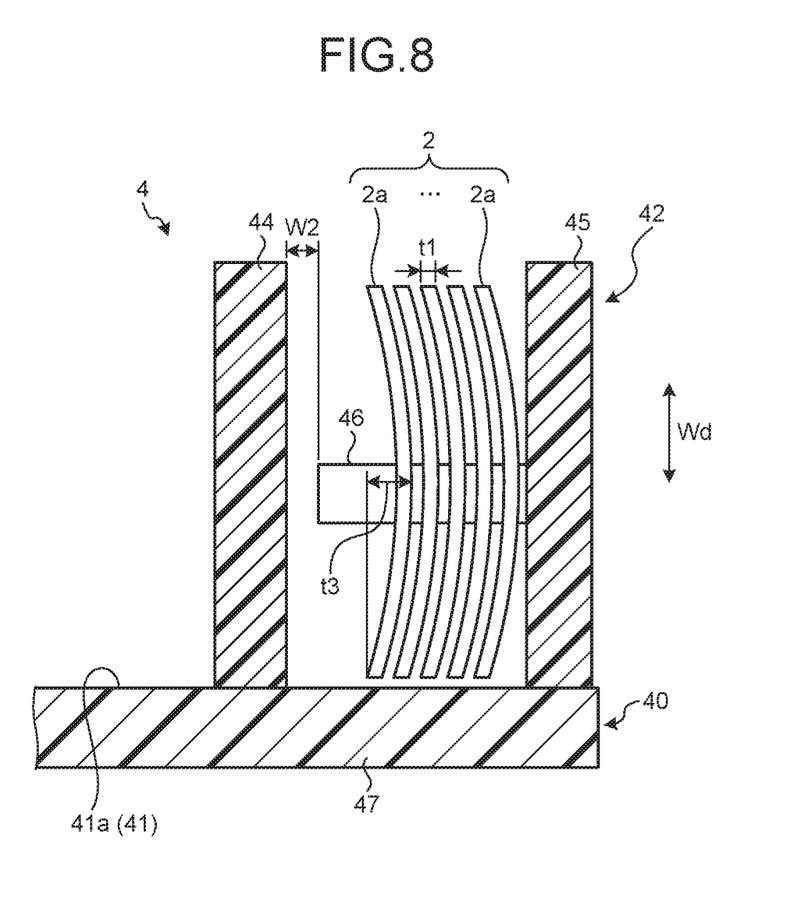
FIG. 8 is a cross-sectional view of the holding portion which holds the regulation member.
Figure 9:
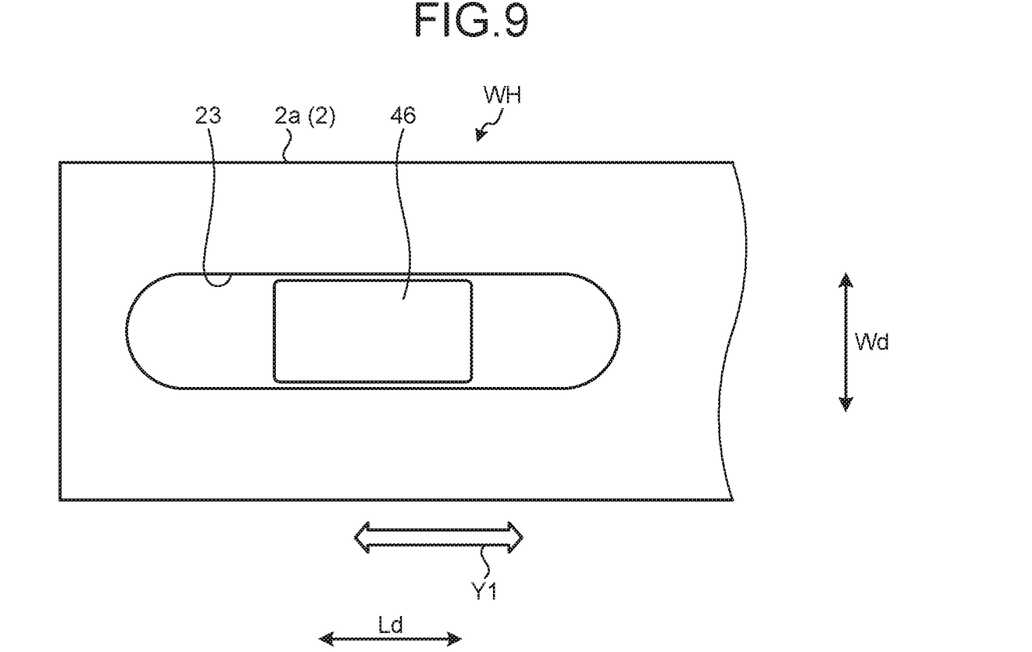
FIG. 9 is a front view of a convex portion which is inserted in a long hole.
Figure 10:
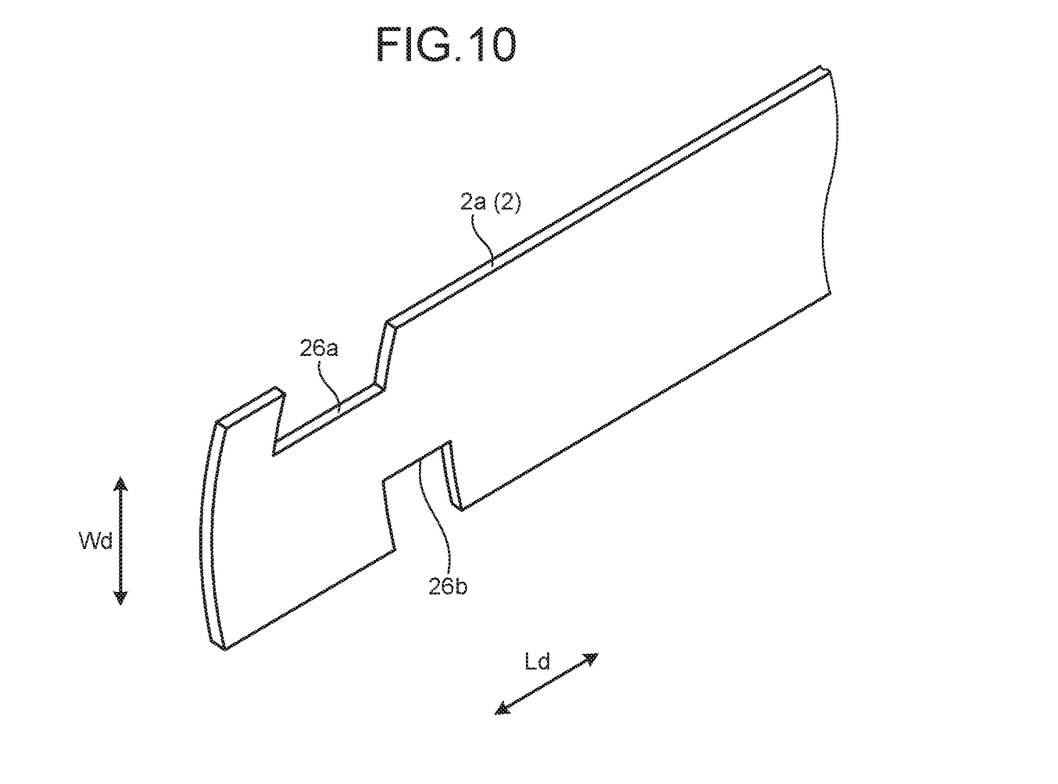
FIG. 10 is a perspective view of a plate member according to the embodiment.
Figure 11:
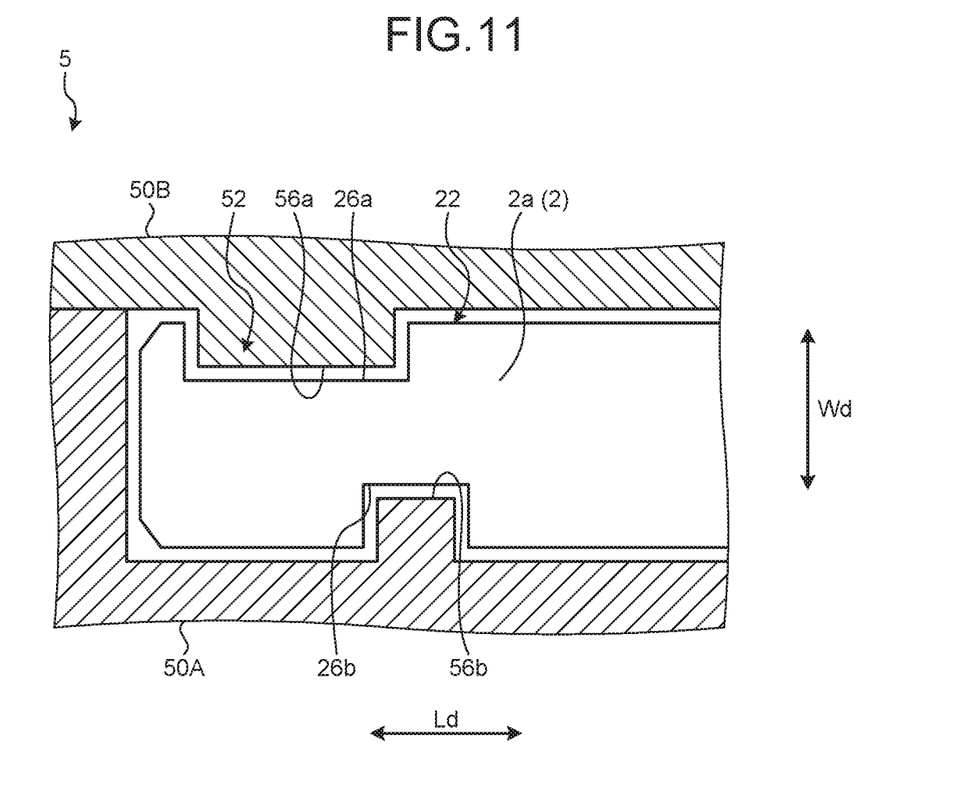
FIG. 11 is a cross-sectional view of a second holding member which holds the regulation member.
Figure 12:
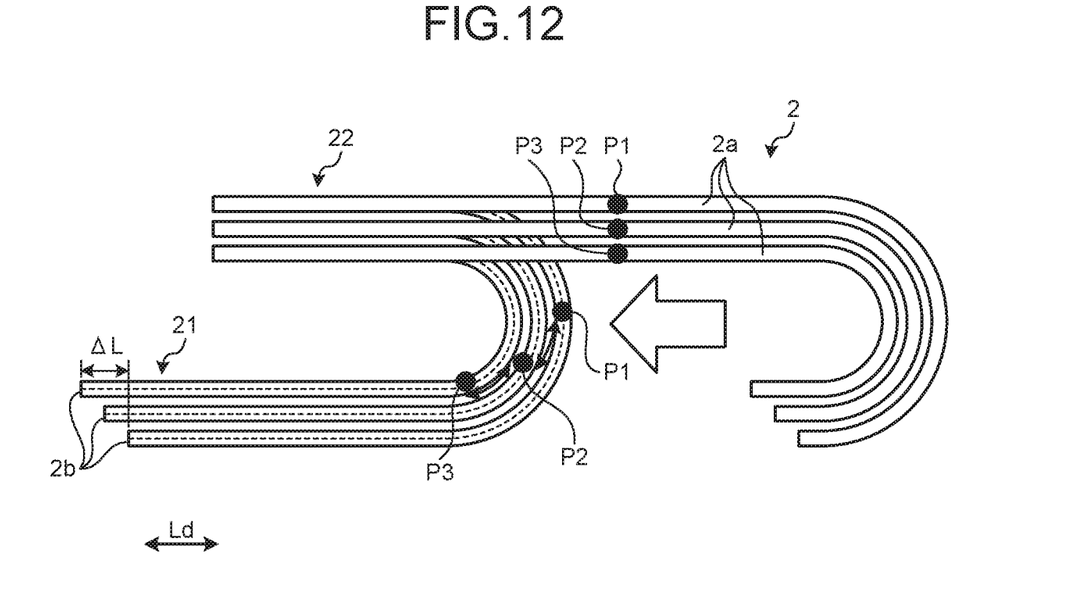
FIG. 12 is a top view for describing an inner/outer circumference difference which occurs in the regulation member.
Figure 13:
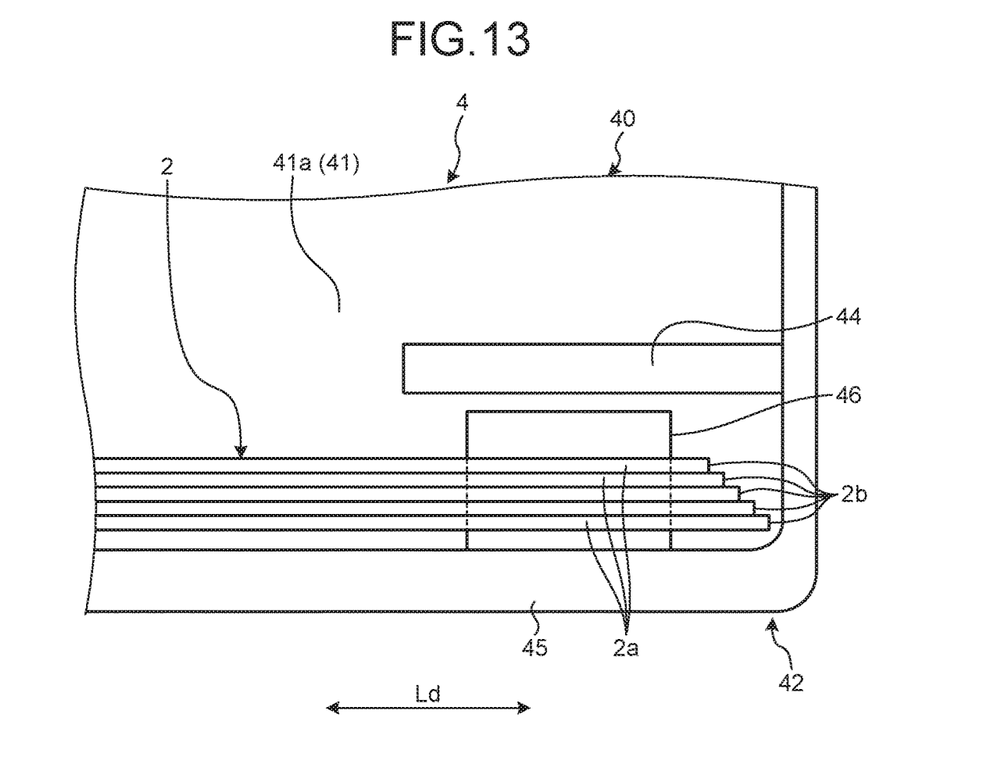
FIG. 13 is a top view for describing relative movement of the plate member.

Embodiments will be described with reference to FIGS. 1 to 13. This embodiment relates to a wire harness. FIG. 1 is a perspective view of the wire harness according to the embodiment, FIG. 2 is a perspective view of a conductor, a regulation member, and an exterior member according to the embodiment, FIG. 3 is a top view of a first holding member according to the embodiment, FIG. 4 is a perspective view of the regulation member according to the embodiment, FIG. 5 is a top view of the holding portion according to the embodiment, FIG. 6 is a cross-sectional view of the holding portion according to the embodiment, FIG. 7 is a top view of the holding portion which holds the regulation member, FIG. 8 is a cross-sectional view of the holding portion which holds the regulation member, FIG. 9 is a front view of a convex portion which is inserted in a long hole, FIG. 10 is a perspective view of a plate member according to the embodiment, FIG. 11 is a cross-sectional view of a second holding member which holds the regulation member, FIG. 12 is a top view for describing an inner/outer circumference difference which occurs in the regulation member, and FIG. 13 is a top view for describing relative movement of the plate member.

As illustrated in FIG. 1, a wire harness WH of this embodiment includes a conductor 1, a regulation member 2, an exterior member 3, a first holding member 4, and a second holding member 5. The wire harness WH of this embodiment further includes a connector which is connected to the conductor 1. The conductor 1 is a flexible conductive member which connects a vehicle body 101 of a vehicle 100 and a slide door 103. The shape of the conductor 1 of this embodiment is a plate shape or a belt shape. The conductor 1 of this embodiment includes a plurality of FFCs (Flexible Flat Cable) 1a as illustrated in FIG. 2. Each FFC 1a includes a plurality of core wires arranged in parallel and a cladding member which integrally covers the plurality of core wires. Each core wire serves as a power line for supplying power or a signal line. A power source 102 is mounted on the vehicle body 101 of the vehicle 100, and supplies power to the slide door 103. The power source 102 is a secondary battery such as a battery. One end of the conductor 1 is connected to the power source 102 and a control device through a connector.

The slide door 103 is a moving body which is mounted in the vehicle 100, and slides with respect to the vehicle body 101. The slide door 103 relatively moves along a front-back direction X of the vehicle with respect to the vehicle body 101. The slide door 103 is, for example, a motor-driven slide door. The slide door 103 includes a device 103a such as a sensor, a switch, and a motor which operates with power supplied from the power source 102. The other end of the conductor 1 is connected to the device 103a through a connector.

The regulation member 2 is a member to regulate a path of the conductor 1. The regulation member 2 is configured by stacking a plurality of flexible plate members 2a as illustrated in FIG. 2. The regulation member 2 has a bending rigidity higher than that of the conductor 1 for example. The plate member 2a of this embodiment is a member made of metal of which the cross section is a curved shape. The cross-sectional shape of the plate member 2a is, for example, an arc shape. The plurality of plate members 2a are overlapped such that a convex surface of one plate member 2a and a concave surface of the other plate member 2a face. The regulation member 2 supports the conductor 1 such that the extending path of the conductor 1 does not come off from a desired path. In the regulation member 2 of this embodiment, the lengths of the plurality of plate members 2a are equal.

The exterior member 3 is a member of a flexible cylindrical shape and, for example, is formed by an insulating synthetic resin. The exterior member 3 of this embodiment is a tube formed in a bellows shape. The exterior member 3 is formed to be freely bent at any place. The cross-sectional shape of the exterior member 3 is, for example, an elliptical shape. As illustrated in FIG. 2, the conductor 1 and the regulation member 2 are inserted in the exterior member 3. The conductor 1 and the regulation member 2 may be inserted in the exterior member 3 together in a state of being overlapped, or may be inserted in the exterior member 3 separately. Both ends of the conductor 1 and the regulation member 2 protrude from the exterior member 3.

The first holding member 4 and the second holding member 5 are members to support the ends of the plurality of plate members 2a. The first holding member 4 holds a first end 21 of the regulation member 2. The second holding member 5 holds a second end 22 of the regulation member 2. As illustrated in FIG. 1, the regulation member 2 includes at least one bent portion 20 between the first holding member 4 and the second holding member 5. The bent portion 20 is a portion which is bent in a case where the wire harness WH is in plan view. The first holding member 4 and the second holding member 5 of this embodiment hold the regulation member 2 such that the regulation member 2 includes at least one bent portion 20.

The first holding member 4 is a member to be fixed to the vehicle body 101. The first holding member 4 is formed of an insulating synthetic resin for example. The first holding member 4 includes a routing groove 41, a holding portion 42, and a locking portion 43 as illustrated in FIG. 3. The routing groove 41, the holding portion 42, and the locking portion 43 are formed in a main body 40 of almost the rectangular shape.

The routing groove 41 is a concave portion formed in the main body 40, and bent in almost S shape. The holding portion 42 is adjacently disposed to the routing groove 41. In the first holding member 4 of this embodiment, the position of the holding portion 42 is near one end 41a in the routing groove 41. The holding portion 42 holds the first end 21 of the regulation member 2.

The locking portion 43 locks the end of the exterior member 3. The locking portion 43 is disposed on an extending line of the routing groove 41. The locking portion 43 locks the exterior member 3 using a pair of walls 43a and 43b which face each other. The walls 43a and 43b include projections corresponding to the concave portion of the exterior member 3. The projections of the walls 43a and 43b are engaged with the concave portion of the exterior member 3 to lock the exterior member 3.

As illustrated in FIG. 4, in the first end 21 of the regulation member 2 of this embodiment, a long hole 23 is formed in each of the plate members 2a. The long hole 23 is formed in the end of the plate member 2a, and the plate member 2a extends along a longitudinal direction Ld. The long hole 23 passes through the plate member 2a along a plate thickness direction. A length L1 of the long hole 23 along the longitudinal direction Ld is longer than a width W1 of the long hole 23 along a width direction Wd of the plate member 2a. The long hole 23 of this embodiment includes a straight portion 24 and an arc portion 25. The straight portion 24 is a portion extending along the longitudinal direction Ld with a constant width W1. The arc portion 25 is disposed at both ends of the straight portion 24. The arc portion 25 is a portion bent in an arc shape, and is a convex shape which protrudes in the longitudinal direction Ld.

In each plate member 2a, the long hole 23 is formed at the same position in the longitudinal direction Ld. Therefore, in a case where the positions of end surfaces 2b of the plurality of plate members 2a are evenly arranged, the long holes 23 of the plate members 2a face each other. In other words, the plurality of long holes 23 are connected to each other, and form one passage extending in the plate thickness direction. The long hole 23 is disposed at the center of the plate member 2a in the width direction Wd for example.

As illustrated in FIGS. 5 and 6, the holding portion 42 of the first holding member 4 includes a first wall 44 and a second wall 45. The first wall 44 and the second wall 45 are a pair of walls facing each other. The holding portion 42 holds the regulation member 2 between the first wall 44 and the second wall 45. The second wall 45 is disposed along the edge of the main body 40, and is erected from a bottom wall 47. The first wall 44 extends along the routing groove 41, and is erected from the bottom wall 47. The first wall 44 and the second wall 45 are in parallel to each other.

The second wall 45 includes a convex portion 46 which protrudes toward the first wall 44. The convex portion 46 is inserted in the long hole 23 of the regulation member 2. A tip end of the convex portion 46 and the first wall 44 are provided with a predetermined gap therebetween. A width W2 of the gap has a size capable of inserting the plate member 2a. In other words, the width W2 of the gap is determined such that the plate member 2a can be plugged in between the convex portion 46 and the first wall 44. A length L2 of the convex portion 46 of this embodiment is smaller than the length L1 of the long hole 23. A thickness t2 of the convex portion 46 has a size equal to or less than the width W1 of the long hole 23. In other words, the shape of the convex portion 46 is a shape capable of being inserted in the long hole 23.

In a case where a worker holds the regulation member 2 in the first holding member 4, for example, in a state where the working overlaps the plate members 2a (that is, the plate members 2a are stacked to be the regulation member 2), the plate members are plugged in the gap between the convex portion 46 and the first wall 44. The plate members 2a are held by the holding portion 42 by inserting the convex portion 46 to the long hole 23 of the plugged-in plate member 2a. Further, the plate members 2a may be plugged in the gap one by one between the convex portion 46 and the first wall 44. In this case, the plate member 2a is held by the holding portion 42 by inserting the convex portion 46 to the long hole 23 of the plugged-in plate member 2a. The worker repeatedly does this work to hold all the plate members 2a by the holding portion 42.

Further, the width W2 of the gap may be variously set to be passed by the elastic deformation of the plate member 2a. In other words, the width W2 of the gap may be set to be smaller than a total thickness t3 of one plate member 2a (see FIG. 8). Herein, the total thickness t3 of the plate member 2a is a thickness from the edge in the width direction Wd in the plate member 2a up to the top of the curved shape. In such a case, the convex portion 46 is regulated from being pulled out of the long hole 23. In this embodiment, the plate member 2a is stored in the holding portion 42 such that the convex surface faces the second wall 45.

As illustrated in FIGS. 7 to 9, the holding portion 42 holds the regulation member 2 in a state where the convex portion 46 is inserted in the long hole 23. The convex portion 46 allows one plate member 2a to relatively move along the longitudinal direction Ld with respect to the other plate member 2a in the state of being inserted in the long hole 23. The plate member 2a is allowed to relatively move along the longitudinal direction Ld with respect to the convex portion 46 as illustrated with arrow Y1 in FIG. 9. Therefore, each plate member 2a can relatively move along the longitudinal direction Ld with respect to the other plate member 2a.

As illustrated in FIG. 10, in the plate member 2a, notches 26a and 26b are formed at the end on a side held by the second holding member 5. The notch 26a is disposed at one edge of the plate member 2a, and the notch 26b is disposed at the other edge.

As illustrated in FIG. 11, the second holding member 5 includes a main body 50A and a cover 50B. The second holding member 5 includes a holding portion 52 which holds the regulation member 2. The holding portion 52 includes convex portions 56a and 56b which lock the notches 26a and 26b. One convex portion 56a is disposed in the cover 50B, and the other convex portion 56b is disposed in the main body 50A. The holding portion 52 substantially regulates the movement of the regulation member 2 along the longitudinal direction Ld. Further, the structure of holding the plate member 2a in the holding portion 52 is not limited to a combination of the notches 26a and 26b and the convex portions 56a and 56b. For example, the holding portion 52 includes a cylindrical convex portion. The end of the plate member 2a may include a round hole to which the cylindrical convex portion is inserted.

The wire harness WH of this embodiment can absorb the inner/outer circumference difference which occurs in the regulation member 2 as described below. As illustrated in FIG. 12, in a case where the regulation member 2 is bent, the inner/outer circumference difference occurs in the adjacent plate member 2a. For example, in a case where a relative position of the plurality of plate members 2a in the second end 22 of the regulation member 2 is fixed, a positional deviation ΔL of the longitudinal direction Ld occurs in the end surface 2b of the plate member 2a in the first end 21 of the regulation member 2. If the relative positions of the plate member 2a are fixed on both ends of the regulation member 2, undesired stress or undesired deformation may occur in the plate member 2a by the inner/outer circumference difference.

With this regard, in the wire harness WH of this embodiment, the relative movement between the plate members 2a along the longitudinal direction Ld is allowed in the holding portion 42 of the first holding member 4. In a case where the inner/outer circumference difference occurs in the plurality of plate members 2a, as illustrated in FIG. 13, the adjacent plate members 2a relatively moves along the longitudinal direction Ld, and a difference in position of the end surface 2b is generated. Therefore, the first holding member 4 and the second holding member 5 of this embodiment can hold the both ends of the regulation member 2 while absorbing the inner/outer circumference difference.

The wire harness WH of this embodiment can absorb a change in the inner/outer circumference difference when the slide door 103 moves between the fully close position and the fully open position. For example, with the setting of a routing path of the conductor 1, the bent portion 20 additionally occurring in the regulation member 2, or the bent portion 20 returning to a straight shape can be taken into consider when the slide door 103 moves between the fully close position and the fully open position. In such a case, even if there is a change in the inner/outer circumference difference, the holding portion 42 of this embodiment can absorb the change in the inner/outer circumference difference. In other words, the holding portion 42 can absorb not only the normal inner/outer circumference difference but also the change in the inner/outer circumference difference. Therefore, the wire harness WH of this embodiment can appropriately exert a function of regulating the path of the conductor 1 in the regulation member 2.

For example, the length L1 of the long hole 23 along the longitudinal direction Ld is set to absorb a maximum inner/outer circumference difference which occurs in the regulation member 2. When the slide door 103 moves between the fully close position and the fully open position, it is assumed that a maximum value of the positional deviation ΔL caused by the inner/outer circumference difference of the plate member 2a is ΔL max. The length L1 of the long hole 23 is set to satisfy the following Inequality (1).

$$L1 - L2 > \Delta L \text{ max} \qquad (1)$$

As described above, with the setting of the length L1 of the long hole 23, the positional deviation ΔL of the longitudinal direction Ld occurring in the plurality of plate members 2a is appropriately absorbed by the long hole 23. Therefore, when each plate member 2a deforms along the movement of the slide door 103, the deformation is hardly hindered by the holding portion 42.

As described above, the wire harness WH according to this embodiment includes the conductor 1, the regulation member 2, the first holding member 4, and the second holding member 5. The conductor 1 is a flexible conductor which connects a vehicle body 101 side of a vehicle 100 and a slide door 103. The slide door 103 is an example of the moving body which is mounted in the vehicle 100, and slides with respect to the vehicle body 101. The regulation member 2 is a member to regulate a path of the conductor 1. The regulation member 2 is configured by stacking a plurality of flexible plate members 2a, and extends along the conductor 1.

In the ends of the plurality of plate members 2a, the long holes 23 extending along the longitudinal direction Ld of the plate member 2a are formed. The long holes 23 are formed at positions facing each other in the plate member 2a. The first holding member 4 includes the convex portion 46 which is inserted in the long hole 23. The convex portion 46 allows one plate member 2a to relatively move along the longitudinal direction Ld with respect to the other plate member 2a in the state of being inserted in the long hole 23. The wire harness WH of this embodiment can absorb the inner/outer circumference difference which occurs in the plurality of plate members 2a when the regulation member 2 is bent.

In the regulation member 2 of this embodiment, the long hole 23 is formed in one of both ends of the plate member 2a. Therefore, the inner/outer circumference difference of the plurality of plate members 2a is absorbed in the end where at least the long hole 23 is formed.

In this embodiment, the length L1 of the long hole 23 along the longitudinal direction Ld is a length at which the inner/outer circumference difference occurring in the plurality of plate members 2a is allowed when the regulation member 2 is bent along the path of the conductor 1. Therefore, the function of regulating the path of the conductor 1 is hardly hindered in the regulation member 2.

First Modification of Embodiment

Figure 14:
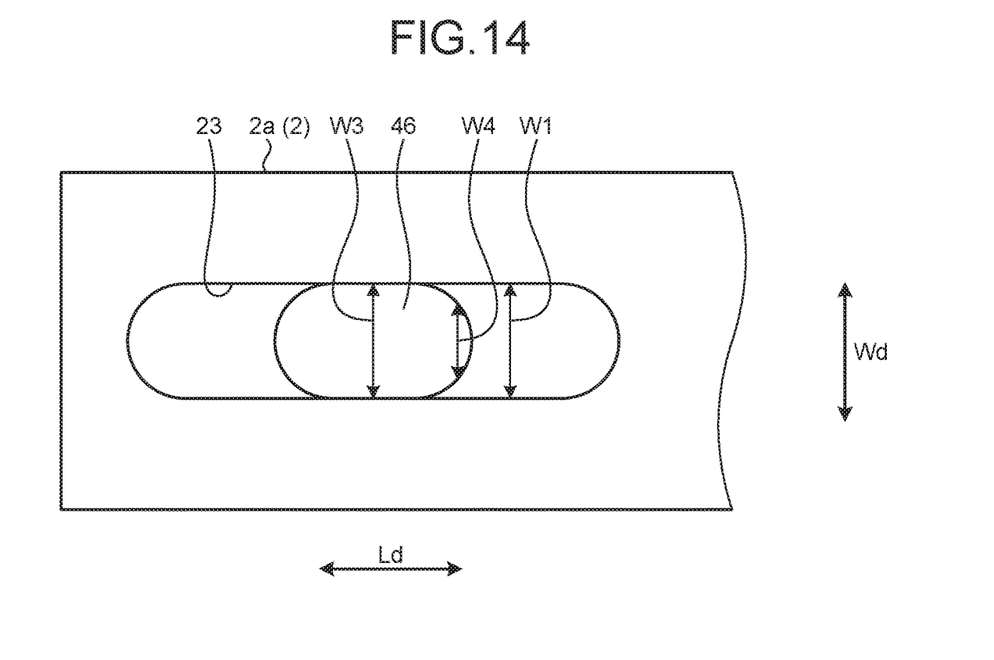
FIG. 14 is a front view illustrating the convex portion according to a first modification of the embodiment.

A first modification of the embodiment will be described. FIG. 14 is a front view illustrating the convex portion according to the first modification of the embodiment. The convex portion 46 according to the first modification of the embodiment is different from the convex portion 46 of the above embodiment in the cross-sectional shape for example. As illustrated in FIG. 14, the cross-sectional shape of the convex portion 46 according to this modification is an elliptical shape. In the convex portion 46, a dimension (length) along the longitudinal direction Ld is longer than a maximum dimension (width W3) along the width direction Wd.

The width W3 of the convex portion 46 in the center in the longitudinal direction Ld is, for example, substantially equal to the width W1 of the long hole 23. A width W4 of the convex portion 46 at the end in the longitudinal direction Ld is narrower than the width W3 of the convex portion 46 in the center. The convex portion 46 of this modification can regulate that the plate member 2a relatively moves with respect to the convex portion 46 along the width direction Wd. In other words, the convex portion 46 can suppress backlash of the regulation member 2 along the width direction Wd. In addition, since the cross-sectional shape of the convex portion 46 is an elliptical shape, it is possible to smoothly insert the convex portion 46 with respect to the long hole 23. In addition, since the cross-sectional shape of the convex portion 46 is an elliptical shape, it is possible to suppress that the convex portion 46 becomes inclined in the width direction Wd with respect to the long hole 23. Further, the tip end of the convex portion 46 may be formed in a tapered shape to be easily inserted to the long hole 23.

As described above, in this modification, the width W3 of the convex portion 46 in the center in the longitudinal direction Ld is wider than the width W4 of the convex portion 46 at the end in the longitudinal direction Ld. The backlash of the regulation member 2 along the width direction Wd can be suppressed by the convex portion 46 by widening the center of the convex portion 46.

Second Modification of Embodiment

Figure 15:
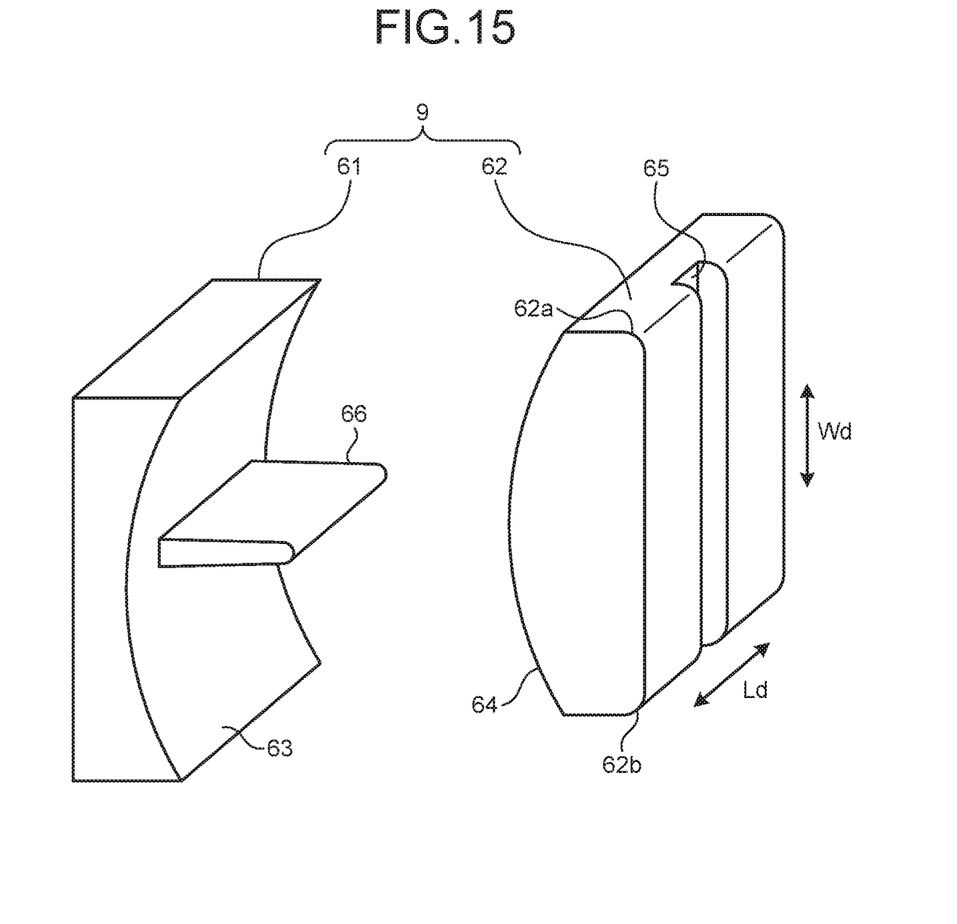
FIG. 15 is a perspective view illustrating an inner member according to a second modification of the embodiment.

A second modification of the embodiment will be described. FIG. 15 is a perspective view illustrating an inner member according to the second modification of the embodiment. An inner member 9 includes a first member 61 and a second member 62. The regulation member 2 is made narrow by the first member 61 and the second member 62. The inner member 9 with the regulation member 2 interposed is held by the holding portion 42. The first member 61 and the second member 62 are combined to form a block of almost a cuboid.

The first member 61 includes a concave surface 63 and a convex portion 66. The concave surface 63 is a curved surface of which the cross-sectional shape is almost in an arc shape. The convex portion 66 protrudes from the center in the width direction Wd in the concave surface 63. The convex portion 66 extends along the longitudinal direction Ld. The cross-sectional shape of the convex portion 66 is, for example, a rectangular shape.

The second member 62 includes a convex surface 64 and a groove 65. The shape of the convex surface 64 corresponds to the shape of the concave surface 63. The convex surface 64 is a curved surface of which the cross-sectional shape is almost in an arc shape. The curvature of the convex surface 64 is similar to that of the concave surface 63 for example. The convex surface 64 includes a concave portion in which a tip end of the convex portion 66 is inserted. The groove 65 is formed in a surface opposite to the convex surface 64 in the second member 62. The groove 65 extends from one end of the second member 62 up to the other end along the width direction Wd.

The convex portion 66 of the first member 61 is inserted to the long hole 23 of each plate member 2a of the regulation member 2, and is engaged with the concave portion of the second member 62. The convex surface 64 of the second member 62 interposes the regulation member 2 in a gap with the concave surface 63 of the first member 61. However, the inner member 9 desirably holds the regulation member 2 to have a gap with respect to the regulation member 2 in order to enable the plurality of plate members 2a to relatively move. The holding portion 42 of the second modification includes a guide projection which guides the groove 65. When the guide projection is inserted in the groove 65, the inner member 9 is positioned in the longitudinal direction Ld.

As described in this modification, the convex portion 66 is formed in the inner member 9. Therefore, it is possible to improve workability in assembling the regulation member 2 to the holding portion 42. In addition, if the inner member 9 is differently used as the number of plate members 2a or the thickness thereof in the regulation member 2 is changed, there is no need to change design of the holding portion 42.

In addition, when the inner member 9 is inserted to the exterior member 3, the inner member 9 is formed such that the corner thereof at a position facing the exterior member 3 is formed in a curved shape. In this embodiment, corners 62a and 62b are formed between both side surfaces in the width direction Wd and the surface where the groove 65, and are chamfered (herein, round surface) so as to be formed in a curved shape. With this configuration, when the regulation member 2 is inserted in the exterior member 3, it is possible to suppress that the inner member 9 is stuck in irregularities of the exterior member 3. In addition, if the regulation member 2 and the inner member 9 are inserted in a direction opposite to the normal direction with respect to the exterior member 3, and the regulation member 2 and the conductor 1 are inserted in the exterior member 3, the corners 62a and 62b come to a side near the conductor 1, and the corners between both side surfaces in the width direction Wd in the first member 61 and the surface on a side opposite to the concave surface 63 come to positions to face the exterior member 3. Herein, the corners between both side surfaces in the width direction Wd in the first member 61 and the surface on a side opposite to the concave surface 63 are different from the corner 62a and the corner 62b, but not formed in a curved shape. Therefore, when the regulation member 2 is inserted in the exterior member 3, getting stuck in irregularities is caused. In other words, if the regulation member 2 and the inner member 9 are inserted in a direction opposite to the normal direction with respect to the exterior member 3, the corners between both side surfaces in the width direction Wd in the first member 61 and the surface on a side opposite to the concave surface 63 interfere with the exterior member 3. Therefore, it is possible to suppress that the regulation member 2 is erroneously inserted to the exterior member 3.

As described above, the wire harness WH of this modification includes the conductor 1, the regulation member 2, the first holding member 4, the second holding member 5, and the inner member 9. The inner member 9 is interposed between the holding portion 42 of the first holding member 4 and the regulation member 2, and is held by the holding portion 42. The inner member 9 includes the convex portion 66 which is inserted in the long hole 23 of the plate member 2a. The convex portion 66 allows one plate member 2a to relatively move along the longitudinal direction Ld with respect to the other plate member 2a in the state of being inserted in the long hole 23.

Further, the inner member 9 may be disposed not only in the first end 21 of the regulation member 2 but also in the second end 22. The inner member 9 disposed in the second end 22 may allow the relative movement of the plurality of plate members 2a, or may regulate the relative movement of the plurality of plate members 2a.

Third Modification of Embodiment

Figure 16:
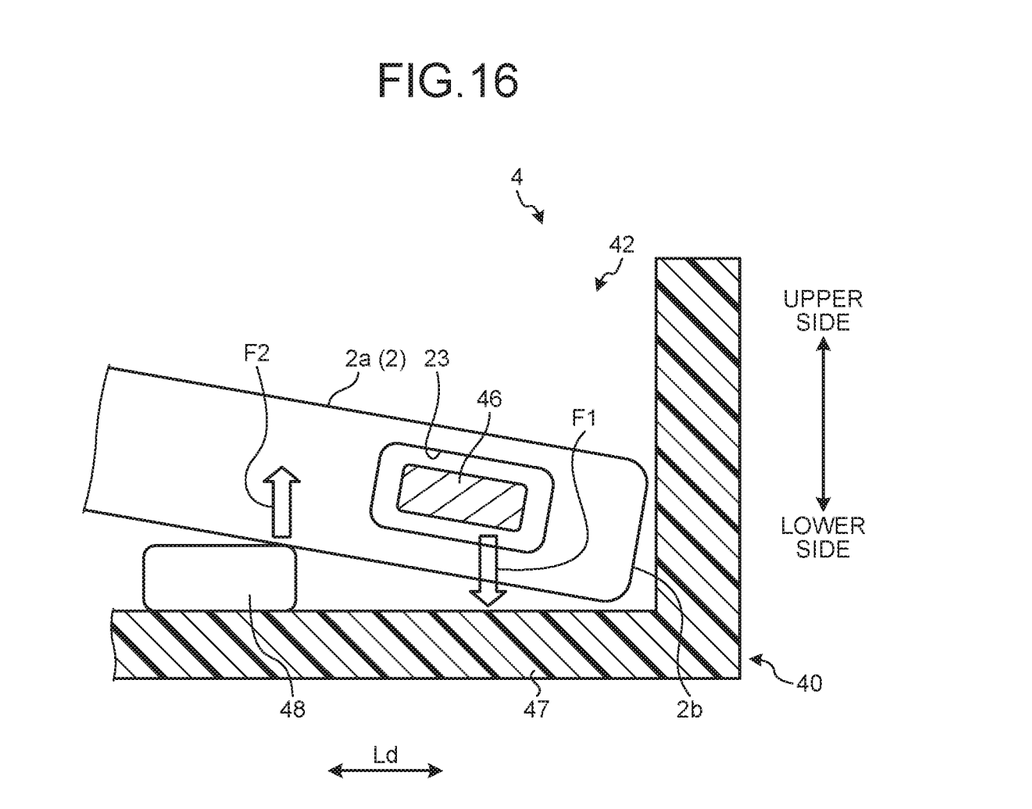
FIG. 16 is a diagram illustrating the holding portion according to a third modification of the embodiment.

A third modification of the embodiment will be described. FIG. 16 is a diagram illustrating the holding portion according to the third modification of the embodiment. The holding portion 42 according to this modification is different from the holding portion 42 of the above embodiment in that, for example, a support convex portion 48 is provided in the bottom wall 47. The support convex portion 48 is disposed on a side opposite to the end surface 2b of the plate member 2a with respect to the convex portion 46.

The support convex portion 48 adjusts an inclined angle of the regulation member 2. More specifically, the support convex portion 48 supports the regulation member 2 such that the regulation member 2 faces upward as it goes from the convex portion 46 to the support convex portion 48 along the longitudinal direction Ld. In this way, the holding portion 42 holds the regulation member 2 in an inclined state, so that the regulation member 2 is suppressed from being sagged. For example, the regulation member 2 receives a supporting force F1 from the convex portion 46 to the lower side in the long hole 23, and receives a supporting force F2 from the support convex portion 48 to the upper side. In this way, the end of the regulation member 2 is supported at two points, so that an inclined posture of the regulation member 2 becomes stable.

Fourth Modification of Embodiment

A fourth modification of the embodiment will be described. The conductor 1 is not limited to the illustrated FFC. As the conductor 1, a round wire, a flat wire, or other wires may be used. The moving body which slides with respect to the vehicle body 101 is not limited to the slide door 103. The moving body may be a sheet which is capable of sliding. In other words, the wire harness WH may be used for connecting the sliding sheet and the vehicle body 101 side.

The long hole 23 may be formed in each of both ends of the plate member 2a. In this case, the convex portion to be inserted to the long hole 23 is provided in the holding portion 52 of the second holding member 5.

The contents disclosed in the embodiments and the modifications may be put into practice by combination in an appropriate manner.

A wire harness according to the embodiment includes a flexible conductor which connects a vehicle body side of a vehicle and a moving body which is mounted in the vehicle and slides with respect to the vehicle body, a regulation member which is configured by stacking a plurality of flexible plate members, extends along the conductor, and regulates a path of the conductor, and a pair of holding member which holds ends of the plurality of plate members. In the ends of the plurality of plate members, the long holes extending along the longitudinal direction of the plate member are formed at positions facing each other. The holding member includes a convex portion which is inserted in the long hole. The convex portion allows one plate member to relatively move along the longitudinal direction with respect to the other plate member in a state where the convex portion is inserted in the long hole. According to the wire harness of the embodiment, the inner/outer circumference difference occurring in the plurality of plate members can be absorbed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A wire harness, comprising:
a flexible conductor that connects a vehicle body side of a vehicle and a moving body, the moving body being mounted in the vehicle and sliding with respect to the vehicle body;

a regulation member that is configured by stacking a plurality of flexible plate members, extends along the conductor, and regulates a path of the conductor;

and a pair of holding members that hold ends of the plurality of plate members, wherein in the ends of the plurality of plate members, long holes are formed which extend along a longitudinal direction of the plate member at positions facing each other, at least one of the pair of holding members includes a convex portion that is inserted in the long hole, and the convex portion allows one plate member to relatively move along the longitudinal direction with respect to another plate member in a state where the convex portion is inserted in the long hole.

2. The wire harness according to claim 1, wherein the long hole is formed at one of both ends of the plate member.

3. The wire harness according to claim 1, wherein a length of the long hole along the longitudinal direction is a length that allows an inner/outer circumference difference occurring in the plurality of plate members when the regulation member is bent along the path of the conductor.

4. The wire harness according to claim 2, wherein a length of the long hole along the longitudinal direction is a length that allows an inner/outer circumference difference occurring in the plurality of plate members when the regulation member is bent along the path of the conductor.

5. The wire harness according to claim 1, wherein a width of the convex portion at a center in the longitudinal direction is wider than a width of the convex portion at an end in the longitudinal direction.

6. The wire harness according to claim 2, wherein a width of the convex portion at a center in the longitudinal direction is wider than a width of the convex portion at an end in the longitudinal direction.

7. The wire harness according to claim 3, wherein a width of the convex portion at a center in the longitudinal direction is wider than a width of the convex portion at an end in the longitudinal direction.

8. The wire harness according to claim 4, wherein a width of the convex portion at a center in the longitudinal direction is wider than a width of the convex portion at an end in the longitudinal direction.

* * * * *